United States Patent [19]

Rabinowitz

[11] Patent Number: 5,160,756
[45] Date of Patent: Nov. 3, 1992

[54] EXTRACTION OF PRODUCTS FROM ALMOND FRUIT

[75] Inventor: Israel N. Rabinowitz, Santa Barbara, Calif.

[73] Assignee: ITD Corporation, Carpinteria, Calif.

[21] Appl. No.: 29,929

[22] Filed: Mar. 24, 1987

[51] Int. Cl.$^5$ .............................................. A23L 1/015
[52] U.S. Cl. ..................................................... 426/431
[58] Field of Search ........................................ 426/431

[56] References Cited

U.S. PATENT DOCUMENTS

| | | | |
|---|---|---|---|
| 3,667,961 | 6/1972 | Algeo | 426/2 |
| 4,087,316 | 5/1978 | Jividen et al. | 127/37 X |
| 4,337,313 | 6/1982 | Hershberger et al. | 435/177 |
| 4,482,761 | 11/1984 | Chao et al. | 127/46.2 X |
| 4,544,778 | 10/1985 | Chao et al. | 127/46.2 X |
| 4,568,557 | 2/1986 | Becker et al. | 426/93 X |

OTHER PUBLICATIONS

Kirk-Othmer, Encyclopedia of Chemical Technology, 3rd Ed., 1981, vol. 16, John Wiley & Sons: New York, pp. 259, 274.

Hawley, The Condensed Chemical Dictionary, 10th Ed., 1981, Van Nostrand Reinhold Co.: New York, pp. 992-993.

*Primary Examiner*—Joseph Golian
*Attorney, Agent, or Firm*—Donald D. Mon

[57] ABSTRACT

A process for driving from almond hulls vegetable fiber acceptable to the human stomach without substantial tannin, almond fruit syrup substantially without tannin, and vegetable tannin from almond hulls, utilizing warm temperature aqueous processes.

3 Claims, 1 Drawing Sheet

EXTRACTION OF PRODUCTS FROM ALMOND FRUIT

FIELD OF THE INVENTION

This invention relates to the extraction of useful products from almond fruit, especially from the almond hull.

BACKGROUND OF THE INVENTION

The chemical composition of almond hulls has been the source of previous comment in the literature. For example, in U.S. Pat. No. 4,482,761 to Chao, the production of inositol and other sugar alcohols, and of sugars. The water extract of almond hulls is disclosed. In this patent, the use of molecular sieves to separate these useful compounds is also disclosed. Sequeira et al, "The carbohydrate composition of Almond Hulls", J. Agri. Food Chem. Vol 18 (1970) pp 950-951 is another discussion of the composition of almond hulls.

Almond hulls are a natural product forming a part of the almond fruit itself. They are produced as a by-product of the processes of producing the most-utilized part of the almond fruit, namely the stone.

It is not a matter of common knowledge, nor well understood in industry and commerce, that the source of the almond nut is a fruit tree. The sweet almond (*Prunus amygdalus*, or *Amygdalus communis*) is specifically a stone fruit (drupe), in which the fleshy part, the mesocarp or "hull", is derived from the ovary of the flower and surrounds the shell (endocarp), teguement (thin papery covering), and finally the stone or "nut" itself. Almond trees are currently cultivated commercially solely for the value of the edible nut, or in the case of the bitter almond, for the flavoring extracts expressed from the otherwise inedible nut. Almonds are most closely related to other stone fruit, such as peach (*Prunus persica*), apricot (*P. armeniaca*) and plum (*P. domestica, P. instititia*, et al.) in which the stone is indeed a stone in the common understanding and is not edible, whereas the mesocarp (not referred to as a "hull") is, and it and forms the basis for the commercial exploitation of these fruit.

The process of growth, maturation, abscission, and senescense of the almond fruit, is such that early in its growth stage the "hull" can be eaten by humans then it prossesses pleasing taste, texture, and nutritional value, whereas by maturation and thereafter the hull is leathery in texture and astringent to the taste, although its nutritional value has actually increased. Unfortunately this increase in nutritional values is accompanied by the presence of other chemical components which can temporarily sicken a human.

As recently as thirty years ago, the nutritional value of the almond hull was not sufficiently understood, and after harvest of the nuts, in California the hulls were either used for landfill, burned for removal, or perhaps burned for their fuel value. Starting about thirty years ago, agricultural scientists in California introduced and pioneered the use of almond hulls in animal feed, primarily cattle, in which animals the chemical components troublesome to humans do not upset the animals, and nutritional value is obtained at low cost.

The inventor in this instant patent application has observed that several chemical components of almond hulls, present after fruit maturation, have individual and important commercial values, and has devised a commercial process to separate and purify each of them, leaving very little to waste. For example, prior to the introduction of the use of hulls for animal feed, almond hulls had a negative or zero commercial value. Currently, for feed usage, almond hulls have a value averaging about $50/ton. The process invention described herein can raise the value of the almond hull (as separate components) to approximately $800/ton.

The success of this process depends upon understanding the physiology and biochemistry of the mature almond fruit and the precise application of commercial separation science techniques to selectively extract components of value without destruction or waste of any of the components.

It is an object of this invention to produce the following as products: vegetable tannins, dietary fiber, and syrups or sweeteners, and potential coproducts such as sorbital, fructose, and inositol.

BRIEF DESCRIPTION OF THE INVENTION

According to this invention, almond hulls are soaked in water to dissolve their water soluble components. Thereafter the hulls are separated from the solution (the "juice") and are strongly mashed or lacerated to rupture their cellular structure as much as possible. The resulting macerate, which may even be a paste, is washed with water to remove the tannin from the hulls, and this wash water is evaporated to produce a dry vegetable tannin product. The washed remainder is a dietary fiber suitable for human consumption.

Further according to the invention, the juice may be clarified to remove stray color bodies and other impurities, evaporated or diluted to a desired concentration, and becomes a useful almond fruit-based sweetener. The presence of inositol in the sweetener is not a disadvantage. It is a natural and beneficial chemical found in all living cells. The syrup product is basically a mixture of fructose and glucose, with a related high ratio of fructose to glucose.

DETAILED DESCRIPTION OF THE INVENTION

Figure 1:
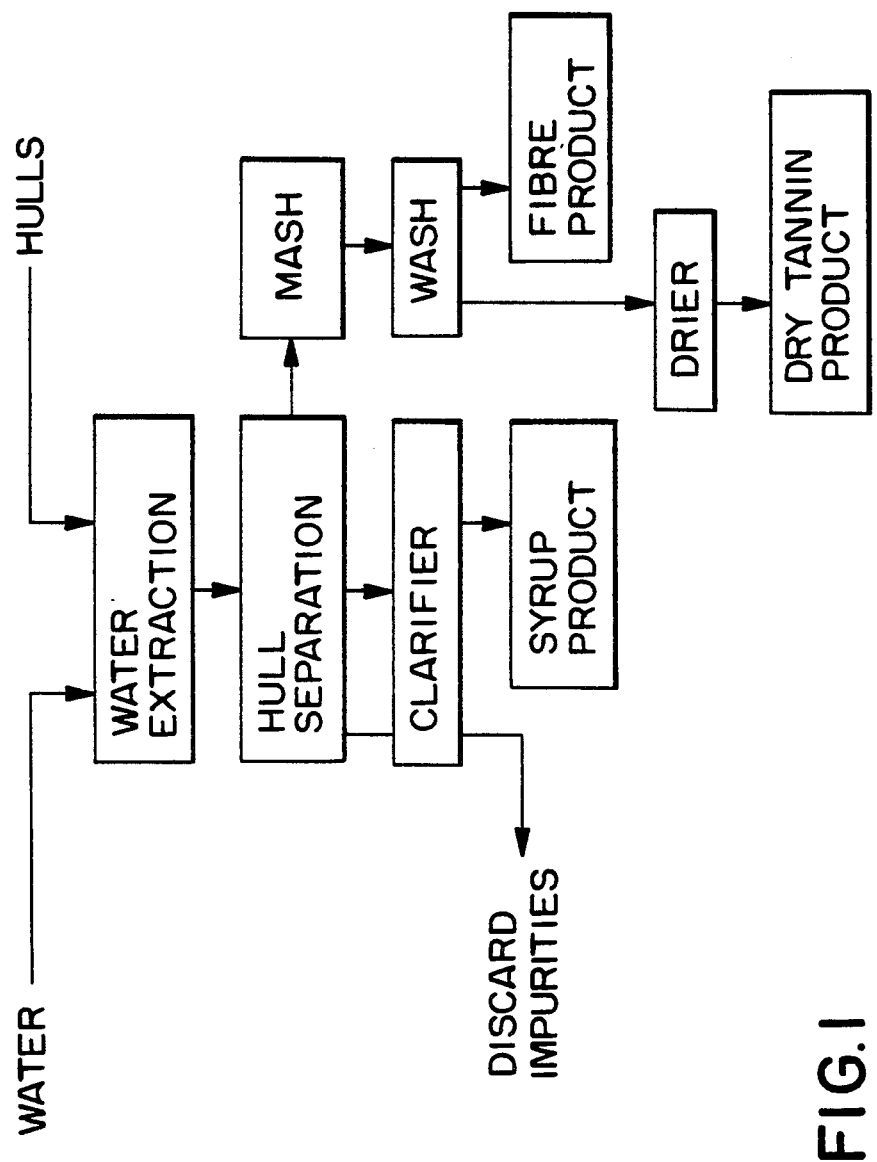
FIG. 1 is a flow chart showing the presently preferred embodiment of the invention.

Almond hulls for this process will usually reach the process as dry or slightly moist large-sized particles. The compounds and compositions of interest to this invention are mostly contained inside the cell walls. When the hulls are soaked, the sugars and sugar alcohols can readily pass through the cell wall, and do so. The tannins, however, do not readily pass through the cell walls. Therefore, when tannins are sought as a product, it is best practice to do as little violence to the cells as possible during the initial soak process. Also, gentle treatment at this time results in less tannins entering the juice, which would have to be removed by clarification procedures. For these reasons, the hulls will preferably not be ground or pulverized before or during the soak procedure.

Water and hulls are added to any suitable vessel, and the hulls are soaked in order to dissolve the sugars and sugar alcohols, which enter into solution. Best results are obtained by the use of classical counter current water extraction techniques, wherein water enters the soaking process at the point at which the extracted hulls ("residue") leave, and the solution ("Juice") leaves the process where the hulls enter. Counter current extraction is not essential to the invention. A one step leach procedure is suitable, but better results are attained with counter current techniques. The extraction is best accomplished at temperatures between about 50 and 70 degrees C.

Hull separation is conveniently a screening or coarse filtration process, preferably without pressing, because pressing may relese tannins into the juice by rupturing the cell walls. However, if maximum juice is the objective, a gentle pressing can be made.

The juice is provided to a clarifier, such as a plate and frame filter, or a multiple step liming precipitation and belt filtration procedure. The resulting extract is a sweet syrup product principally containing fructose, glucose, and sugar alcohols including inositol and sorbitol. It may be concentrated by evaporation or diluted with water to the desired degree of concentration or sweetness.

The extracted hulls are provided to a macerator, which preferably subjects them to severe stresses with the objective of rupturing the cell walls. Removal of tannins and other color bodies which are also bitter to the taste, from what will ultimately become dietary fiber for human consumption, is desirable, and is facilitated by rupturing the cell membranes. However, even without severe stresses, the tannins can ultimately largely be leached out. However, the hulls should be comminuted or shredded to at least 1/16" to ½" size with a median of about ⅛" largest dimension. Preferably the result will be nearly paste-like. A disintegrator of the "lump buster" type may be used, or any comminuter capable of handling a high moisture content solution. Tannins are then leached out of the water suspension of shredded desugared hulls by first raising the pH of the suspension to approximately 7.0–12.0, preferably about pH 8.5–9.0, and achieving approximately 98% removal of tannins by simultaneous counter current extraction. Soak and press may be effected with soaking in a kettle and pressing in a plate and frame or belt filter procedure. Several alkalies may be used to raise the pH to 7.0–12.0. Two good choices are soda ash or potash for reasons of buffering ability, cost, and effectiveness. Potash may have an additional advantage in leaving behind traces of potassium, rather than sodium, in a dietary fiber for human consumption. The tannin extracted fiber is then dried to 95%–99% moisture content and finally ground to end user specification for particle size. The particle size affects such properties as taste and texture, and the particle size has other known effects on flowability, and compressibility.

The extracted tannin solution can be concentrated to a purified tannin dry powder through several methods. One method involves concentration via reverse osmosis/ultrafiltration followed by evaporation to a concentrated slurry and spray drying to a powder. A second method involves specific precipitation of the tannins in the fiber extract with suitable precipitating agents. Many of these agents are well known in the industry and include metal salts, protein preparations, such as gelatin, and natural or synthetic polyelectrolytes such as polyvinylpyrollidone. A good recovery of precipated tannin is obtained in this procedure, and the precipitated tannin complex is then dried and milled to a suitable powder particle size. The products produced from almond hulls by these processes greatly upgrade an agricultural product which after many years of being regarded as a nuisance, was first raised to the status of a cheap cattle feed supplement, and now is a source of valuable products. Now by means of this invention it provides a good sweetener as one product.

Most importantly, it provides to the United States a source of vegetable tannin which it does not now possess. Metal tannins are a nuisance, both in use and in disposal. Vegetable tannins are much preferred, but their principal source is from the bark of trees. Tree barks can be harvested only in cycles of many years. This means it must come from a country where the economics permit such cycles and land use. That largely excludes the United States, and for this reason substantially all vegetable tannins are imported. This invention can return this industry to the United States.

In addition, dietary fibers are in great demand, especially vegetable fibers. They are quite costly and are sparingly used in large-volume products such as breakfast cereals. There is an extremely large market awaiting an affordably-priced good quality fruit fiber such as this invention provides.

This invention thereby provides products from a low-grade source. Three excellent products are obtained, at least one of which brings a source to the United States.

This invention is not to be limited to the embodiment shown in the drawings and described in the description, which is given by way of example and not of limitation, but only in accordance with the scope of the appended claims.

I claim:

1. The process of extraction of products from almond hulls, comprising:
   a. soaking almond hulls in warm water at a temperature between about 50 degrees Centigrade to about 70 degrees Centigrade to extract soluble substances therefrom, without exertion of substantial force on said hulls which would be disruptive of the parenchyma cells in the hulls, thereby to produce juice and hull residue, and separating said juice from said hull residue;
   b. subjecting said hull residue while wet to substantial mechanical force disruptive of the parenchyma cells in the residue;
   c. washing the product of step b with water at a pH between about 8.5 and about 9.0 to dissolve tannin therefrom; and
   d. separating the fiber residue from the liquid resulting from step c thereby producing said fiber residue as a fiber which is substantially free from tannin, which is not digestible in the human digestive tract and which is tolerable by it due to the absence of substantial amounts of tannin.

2. The process of providing a vegetable tannin from almond hulls comprising separation of tannin from the liquid resulting from steps of claim 1.

3. The process according to claim 1 in which potash or soda ash is added to step c.

* * * * *